Figure 1:
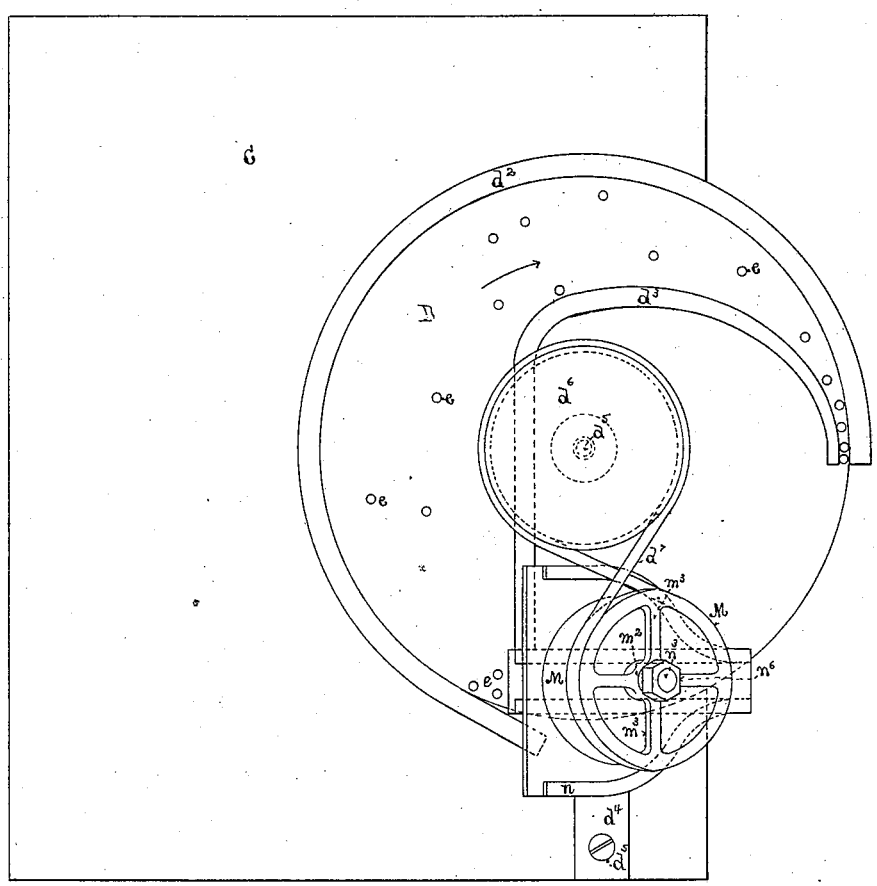

(No Model.)  
4 Sheets—Sheet 1.

P. BUTLER.
DEVICE FOR FEEDING SHELLS OF CAPS TO MACHINES.

No. 306,807.  
Patented Oct. 21, 1884.

Witnesses  
Wm. D. Brown  
N. P. Ockington.

Inventor  
Paul Butler  
By David Noel Rice  
Atty (No Model.)
4 Sheets—Sheet 2.
P. BUTLER.
DEVICE FOR FEEDING SHELLS OF CAPS TO MACHINES.
No. 306,807.
Patented Oct. 21, 1884.
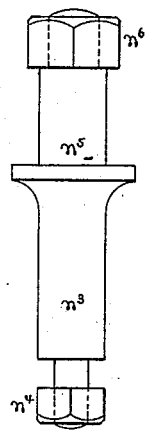
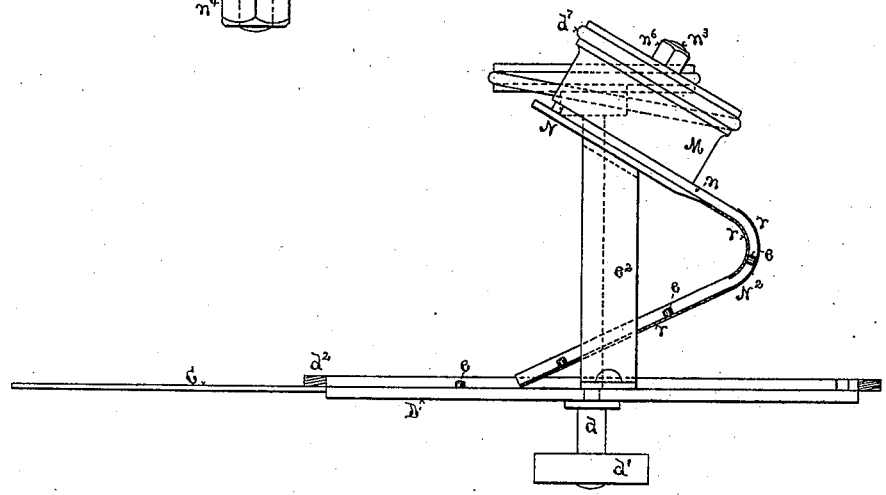
Witnesses
Inventor (No Model.)
P. BUTLER.
DEVICE FOR FEEDING SHELLS OF CAPS TO MACHINES.
No. 306,807. Patented Oct. 21, 1884.
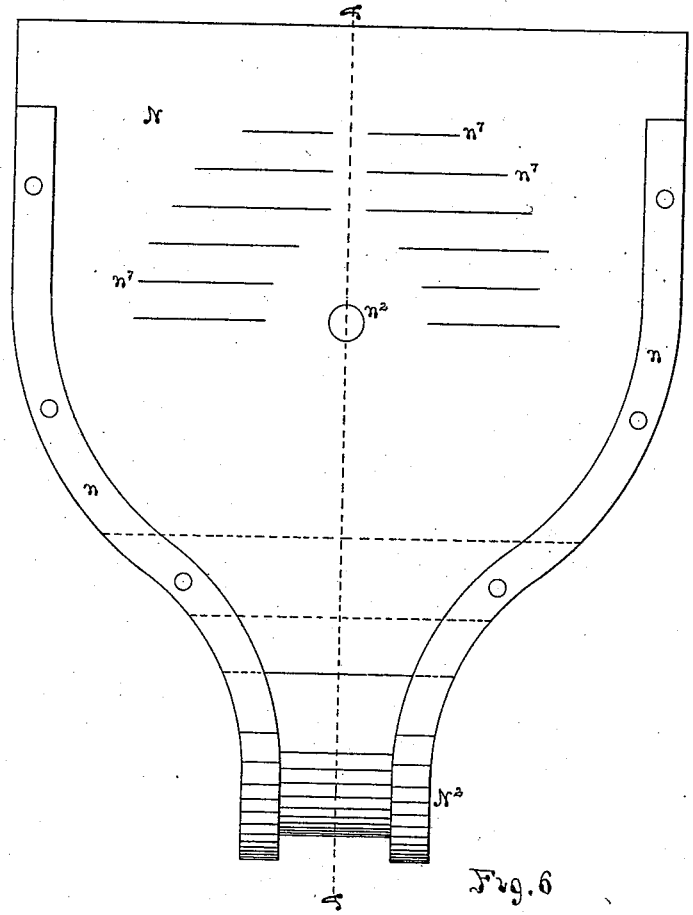
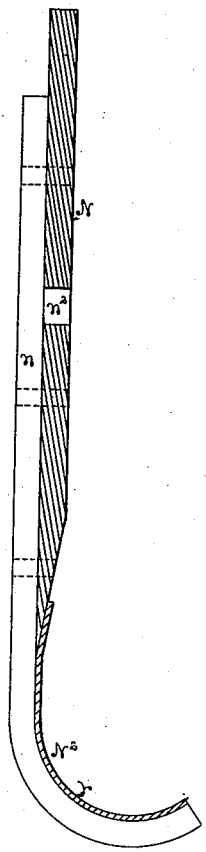
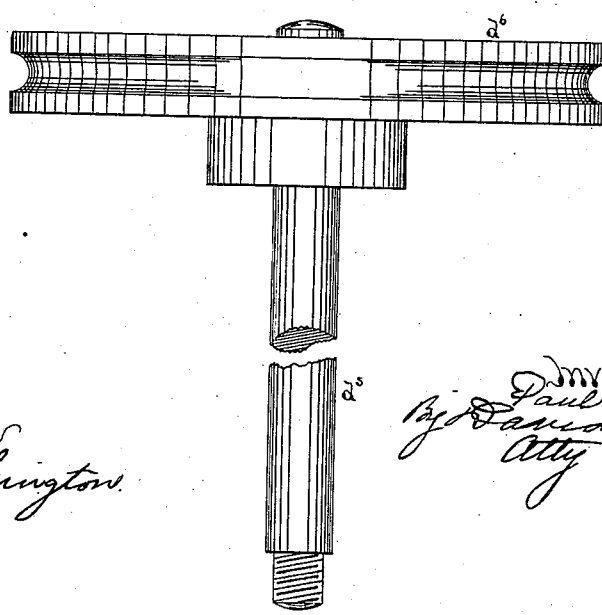

(No Model.) 4 Sheets—Sheet 4.
P. BUTLER.
DEVICE FOR FEEDING SHELLS OF CAPS TO MACHINES.
No. 306,807. Patented Oct. 21, 1884.
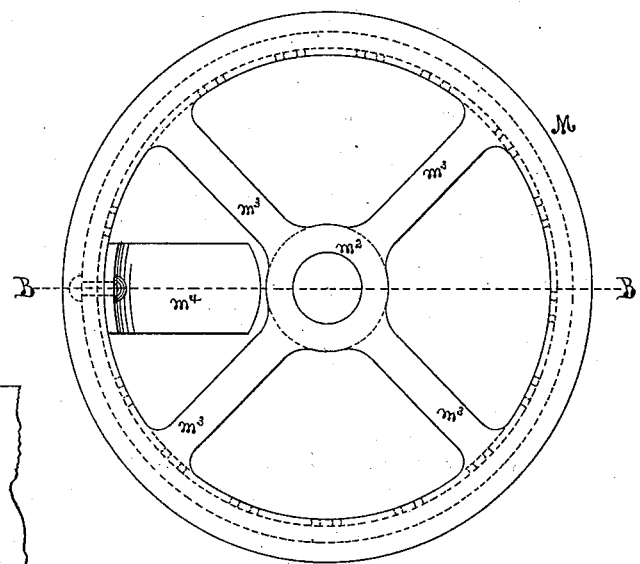
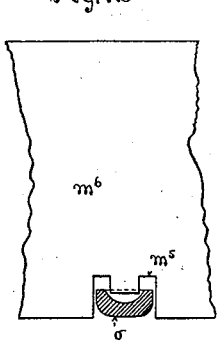
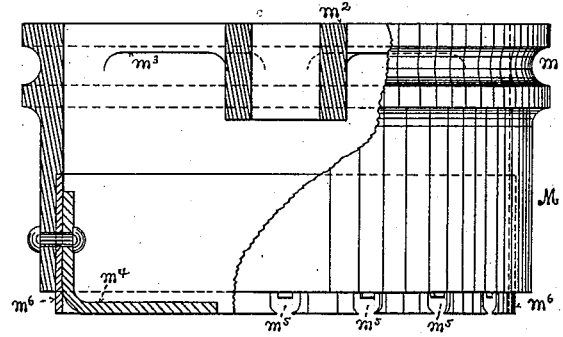
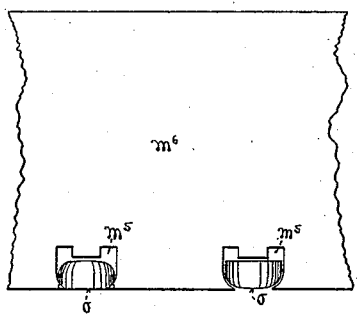
Witnesses
Wm. S. Brown
N. P. Ockington
Inventor
Paul Butler
By David Hale Rice
Atty
N. PETERS. Photo-Lithographer, Washington, D.C.

UNITED STATES PATENT OFFICE.

PAUL BUTLER, OF LOWELL, MASSACHUSETTS.

DEVICE FOR FEEDING SHELLS OF CAPS TO MACHINES.

SPECIFICATION forming part of Letters Patent No. 306,807, dated October 21, 1884.

Application filed March 17, 1884. (No model.)

*To all whom it may concern:*

Be it known that I, PAUL BUTLER, of Lowell, in the county of Middlesex and State of Massachusetts, have invented a new and useful Improvement in Machines for Feeding Shells of Caps and other Similar Shells, of which the following is a specification.

My invention relates to machines for feeding shells of caps, primers, and other similar shells to other machines where they are required to be delivered in a certain particular direction and relative position, in order to be subjected to the subsequent processes of such other machines in a proper manner; and it consists in the combination of mechanisms for that purpose, substantially as hereinafter described and claimed.

In the drawings, Figure 1 represents a top plan view of my invention as applied to a feeding-plate of well-known construction for feeding cartridge-shell primers to the cartridge-priming machine. Fig. 2 represents a side elevation of the same. Fig. 3 shows a post enlarged, used as hereinafter described in my machine. Fig. 4 is a top view of the bed-plate of my machine with the attached conduit. Fig. 5 is a section of same through the lines A A of Fig. 4. Fig. 6 is a detached view of the driving-pulley which drives the machine. Fig. 7 is a side elevation, partly in section, on the line B B of Fig. 8 of the reservoir into which the primers are poured to be fed out in the proper position. Fig. 8 is a top view of Fig. 7. Fig. 9 is an enlarged view of a section of the wall of the reservoir, showing the primer-feeding apertures and the proper position of a primer for feeding through these apertures and an improper position in which it cannot pass through. Fig. 10 is a side view of a primer in position for being fed from the reservoir. Fig. 11 is a detail view of it in the position in which it cannot pass from the reservoir. Fig. 12 is a modification of Fig. 9, showing a different form of aperture to accomplish the same purpose.

C is a table supported in any proper manner, to which is attached a circular disk or plate, D, by a shaft, $d$, Fig. 2, which passes through the table, and has on its lower end a pulley, $d'$, which is used to give a rotary movement to the plate in the direction of the arrow, the pulley $d'$ being driven by any proper motor.

Around the edge of the plate D is the rim $d^2$, attached to the table and projecting above the surface of the plate D to confine the primers on said plate as they are fed around it. A second flange, $d^3$, is held in a stationary position upon the table just above the surface of the rotary plate D by means of a bracket, $d^4$, which is attached by one or more screws, $d^5$, to the table C. The flange $d^3$ is made elastic at its free end, where it approaches the rim $d^2$, so as to allow the primers to pass one at a time between it and the rim.

$e\ e$ represent the primers lying upon the plate D, by the rotation of which they are carried around, and, passing between the flange $d^3$ and rim $d^2$, are fed to the priming-machine attached upon the side of the table C in the ordinary and well-known manner. This rotating plate D, rim $d^2$, and flange $d^3$ are well-known mechanisms for this purpose, as well as to feed primers and shells to other classes of machines, and need not be further described.

Heretofore it has been customary to have an attendant place the primers $e\ e$ right side up on the revolving plate D, in order that when they pass between the rim $d^2$ and flange $d^3$ they may be fed to the subsequent mechanisms operating upon them in proper position, and this duty has required the constant labor of an attendant upon the feeding-plate D. My improvement is designed to perform this duty by machine, and save time and labor, and insure greater certainty of the primers being delivered from the plate D right side up.

To the bracket $d^4$, I attach an upright post or arm, $e^2$, (shown in Fig. 2,) which supports an inclined bed-plate, N. Upon this bed-plate N is a rim, $n$, forming at the lower part of the incline of the bed-plate a segment of a circle on each side of it, into which the circumference of a circular box or reservoir, M, fits. This reservoir M consists of a segment of a cylinder open at both ends, and having an enlarged part, with a groove, $m$, around its periphery, near the top, to receive a cord to cause it to revolve, as hereinafter described. In the top of the reservoir is a central hub, $m^2$, connected to its upper edge by four arms, $m^3$, so as to be integral with it, as shown in Figs. 1, 7, and 8.

The reservoir M is attached to the bed-plate N in the following manner: A hole, $n^2$, is made through the bed-plate, near its center, as shown in Figs. 4 and 5, and into this hole is set the post $n^3$, the smaller lower end of the post fitting in the hole, and the nut $n^4$, being screwed up solidly on the bottom side of the bed plate N, brings the lower shoulder of the post down upon the top of the bed-plate and secures it rigidly therein. The upper end of the post $n^3$ is provided with a cylindrical bearing part, $n^5$, which fits into the central hole in the hub $m^2$ of the reservoir, so as to allow the latter to revolve thereon, the nut $n^6$ being screwed down to a shoulder on top of the bearing $n^5$, to keep the reservoir from rising off of the bearing when in place, as shown in Figs. 1 and 2. The height of the bearing $n^5$ above the bed-plate N is just sufficient to allow the reservoir M to have its lower edge close to the upper surface of the bed-plate N.

Centrally in the revolving plate D is screwed a vertical post, $d^5$, to the upper end of which is attached the band-wheel $d^6$, having a groove in its periphery, around in which and in the groove $m$ of the reservoir M is passed the band $d^7$, thus causing the reservoir M to revolve by the rotation of the plate D.

Within the annular wall of the reservoir M, on its upper surface, the bed-plate N has certain small scores or roughened places, $n^7$ $n^7$, and attached to the inner wall of the reservoir is an arm, $m^4$, which projects its lower surface radially from the wall of the reservoir inward parallel to the surface of the bed-plate N. The purpose of this arm $m^4$ is to continually stir up and turn over the primers within the reservoir as the latter revolves, and thus insure a certain proportion of them being turned right side up to escape from the reservoir, as hereinafter described.

The annular wall of the reservoir M is made of two parts, an outer and thicker part, which projects downward far enough to revolve just above the rims $n$ $n$ on the bed-plate N, where the rims are concentric with the axis of the reservoir, and an inner annular part of the wall of the reservoir $m^6$ projecting downward below the outer part, almost to the surface of the bed-plate N. In this lower edge of the wall $m^6$ are made a series of openings or notches, $m^5$ $m^5$, so formed with relation to the exterior form of the primers that when the primers are one side up they cannot pass through these holes $m^5$; but when they are the other side up, they will just slip through, as is shown in Figs. 9, 10, and 11, in which $o$ $o$ represent the primers. The purpose of having a series of these openings $m^5$ is to allow a greater number of primers to escape during a given time, as one opening would do a proportional part of the work in the same manner as any of the others.

Attached to the lower side of the bed-plate N is a conduit, $N^2$, having its sides $r$ $r$ above and below the internal passage of the same just far enough apart to receive a primer between them flatwise, and keep it in the same relative position with relation to said opposite sides which it has when it enters the conduit until the primer is delivered upon the rotating plate D, the conduit $N^2$ being bent or curved around to bring its lower end just above and almost touching the surface of the plate D, as shown in Figs. 1 and 2. This conduit is in the form of a tube, rectangular in cross-section, having its sides $r$ $r$ separated the proper distance apart by edge-pieces between the edges of the sides, through which edge-pieces the sides are secured together by rivets or otherwise, in any ordinary and well-known manner. The edge-pieces may be a continuation of the rims $n$ $n$, if desired.

The operation of the machine is as follows: The parts being mounted in position, as shown in Figs. 1 and 2, a quantity of primers are poured loosely into the top of the reservoir M, when they will fall down into the lower side of it upon the inclined bed-plate N, and are prevented from escaping by the annular wall of the reservoir on that side. The rotation of the plate D and the reservoir M continually brings opposite the mass of primers in the reservoir the openings $m^5$ $m^5$, and whenever a primer the proper side up is pressed against one of the openings by the mass of primers behind it it slips through the opening, slides down the bed-plate N into the conduit $N^2$, and through the latter, in which it cannot turn over, upon the rotating plate D the right side up to be fed by the latter into the capping or other machine which is to perform the subsequent processes upon it; but whenever a primer is pressed against an opening $m^5$ wrong side up it cannot get through and the opening passes by it, while the stirring-arm $m^4$ passes through the mass of primers and turns a certain proportion of them over at each passage in position to escape through an opening or openings $m^5$, and be fed right side up upon the rotating plate D.

In Figs. 4 and 5 I have represented the bed-plate N and its connection with the conduit $N^2$ with the upper side of the conduit removed for the sake of clearness, and I have represented the conduit in this instance as curved between the bed-plate N and the rotating plate D, so as to turn the primers over in their passage through the conduit, they being fed out of the opening $m^5$ the other side up from what they are delivered on the bed-plate; but this construction, although preferable with this particular form of primer, is not necessary, as the conduit $N^2$ might be made straight in its downward incline instead of curved, and the openings $m^5$ be made to allow the escape of the primers through them the same side up as they are delivered on the plate D without departing from the spirit of my invention.

Instead of giving the reservoir M a circular motion by a band, it might be given either that or a reciprocal rotary motion by attaching a short crank upon the post $d^5$ and a crank upon the top or side of the reservoir, and connecting these cranks by a link while parallel to each other, or nearly so, in the ordinary and well-known manner; or the band $d^7$ might be removed and the reservoir M revolved by hand and accomplish the same results—$i$ $e$., the automatic delivery of the primers from the reservoir all the same side up; or the bolts holding the wall $m^6$ to the reservoir might be taken out and the outer ends of the arms $m^3$ attached to the upper edge of the wall $m^6$, instead of to the outer shell of the reservoir, and the latter allowed to remain stationary while the wall alone moved, as is obvious to any mechanic, without departing from the spirit of my invention, the substantial part of which is the passing of the wall $m^6$ provided, with openings $m^5$, past a mass of primers resting against it and adapted to escape through such openings only when a particular side up, which I believe to be novel with me.

I do not confine myself to a cylindrical reservoir, as other shapes of the reservoir-wall may be varied somewhat and still subserve the same purpose, and the motion of the wall $m^6$ past the mass of shells might vary from a circle and accomplish the same result.

Fig. 12 shows a modification of the opening $m^5$, which may be used with the primer shown, if desired.

It will be observed that the wall $m^6$, with its openings $m^5$, moves past the mass of shells charged with fulminate beneath them, so that the action of gravity alone carries them through the openings $m^5$, and thus all danger of exploding the primers in the reservoir by any mechanical means for forcing them through the openings is avoided, which is very important.

What I claim as new and of my invention is—

1. In combination with suitable bearings upon which to move the same, the wall $m^6$, provided with one or more openings, $m^5$, formed substantially of the contour of the shell in cross-section, and to allow the shells to escape through them only one predetermined side uppermost, and adapted to move past and beneath a mass of such shells and allow them to escape through said openings by force of gravity, substantially as described.

2. In combination with the reservoir, the movable wall $m^6$, provided with one or more openings, $m^5$, formed substantially of the contour of the shell in cross-section, and to allow the shells to escape by their gravity through them only one predetermined side uppermost, and suitable mechanism for moving the same, substantially as described.

3. The combination of the bed-plate N, inclined from a horizontal direction, and the wall $m^6$, adapted to move on suitable bearings, and provided with one or more openings, $m^5$, formed to allow the shells to escape through them only one predetermined side uppermost, substantially as described.

4. The combination of the bed-plate N, conduit $N^2$, and the wall $m^6$, adapted to move on suitable bearings, and provided with one or more openings, $m^5$, formed substantially of the contour of the shell in cross-section, and to allow the shells to escape through them by their gravity only one predetermined side uppermost, substantially as described.

5. The combination of the feed-plate D, conduit $N^2$, and bed-plate N, arranged substantially as set forth, with the wall $m^6$, adapted to move on suitable bearings, and provided with one or more openings, $m^5$, formed to allow the shells to escape through them only one predetermined side uppermost, substantially as described.

6. The combination, with the bed-plate N, supporting the shells beneath them, of the revolving wall $m^6$, provided with one or more openings, $m^5$, formed to allow the shells to escape through them only one predetermined side uppermost, substantially as described.

7. The combination of the conduit $N^2$ and bed-plate N, arranged substantially as set forth, with the revolving wall $m^6$, provided with one or more openings, $m^5$, formed to allow the shells to escape through them only one predetermined side uppermost, substantially as described.

8. In combination with the bed-plate N and wall $m^6$, adapted to move on suitable bearings, and provided with one or more openings, $m^5$, formed to allow the shell to escape through them only one predetermined side uppermost, and arranged substantially as set forth, the stirring-arm $m^4$, substantially as described.

9. In combination with the bed-plate N and rotary reservoir M, adapted to deliver through its side wall the shells only one predetermined side uppermost, the conduit N, having its opposite sides formed and placed relatively to each other a distance apart slightly greater than the vertical breadth of the shell, to receive the shells with that side uppermost, and convey them and control their movement through it, and deliver them a predetermined side uppermost, substantially as described.

10. In combination with the reservoir M, provided with openings $m^5$ in its wall, the inclined bed-plate $N_1$ and the conduit $N^2$, having a curved throat or passage-way formed of opposite walls of curved form, the upper wall at the top of the throat being the lower wall at the bottom, and the lower wall at the top being the upper one at the bottom of the throat, substantially as described.

PAUL BUTLER.

Witnesses:
LEPINE H. RICE,
DAVID HALL RICE.